J. H. Manny.

Mower.

Patented Oct. 17, 1854.
Reissued Mar. 6, 1855.

№ 298

J. H. Manny.

Mower.

No. 298

Patented Oct. 17, 1854
Reissued Mar. 6, 1855.

J. H. Manny.

Mower.

No. 298

Patented Oct. 17, 1854.
Reissued Mar. 6, 1855.

UNITED STATES PATENT OFFICE.

JOHN H. MANNY, OF ROCKFORD, ILLINOIS.

IMPROVEMENT IN GRAIN AND GRASS HARVESTERS.

Specification forming part of Letters Patent No. 11,810, dated October 17, 1854; antedated June 15, 1854; Reissue No. 298, dated March 6, 1855.

DIVISION A.

*To all whom it may concern:*

Be it known that I, JOHN H. MANNY, of Rockford, in the county of Winnebago and State of Illinois, late of Freeport, in the county of Stephenson, in the same State, have invented certain new and useful Improvements in Harvesting-Machines, of which the following is a full, clear, and exact description, reference being had to the accompanying drawings, which make part of this specification, and in which—

Figure 3:
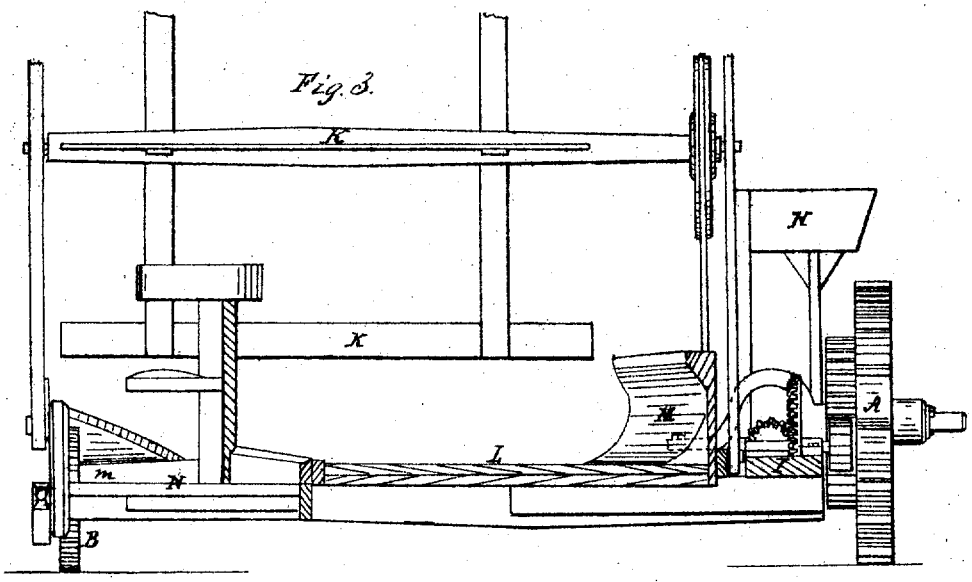
Figure 1:
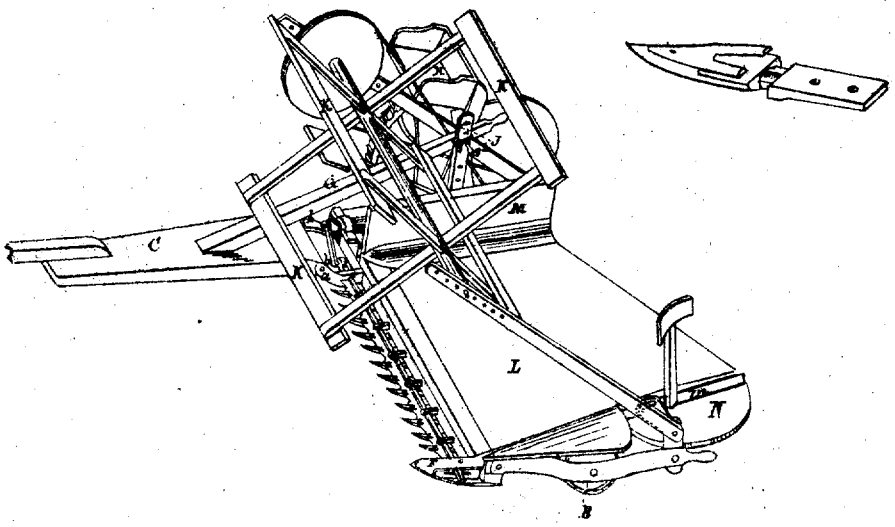
Figures 2, 6, 7:
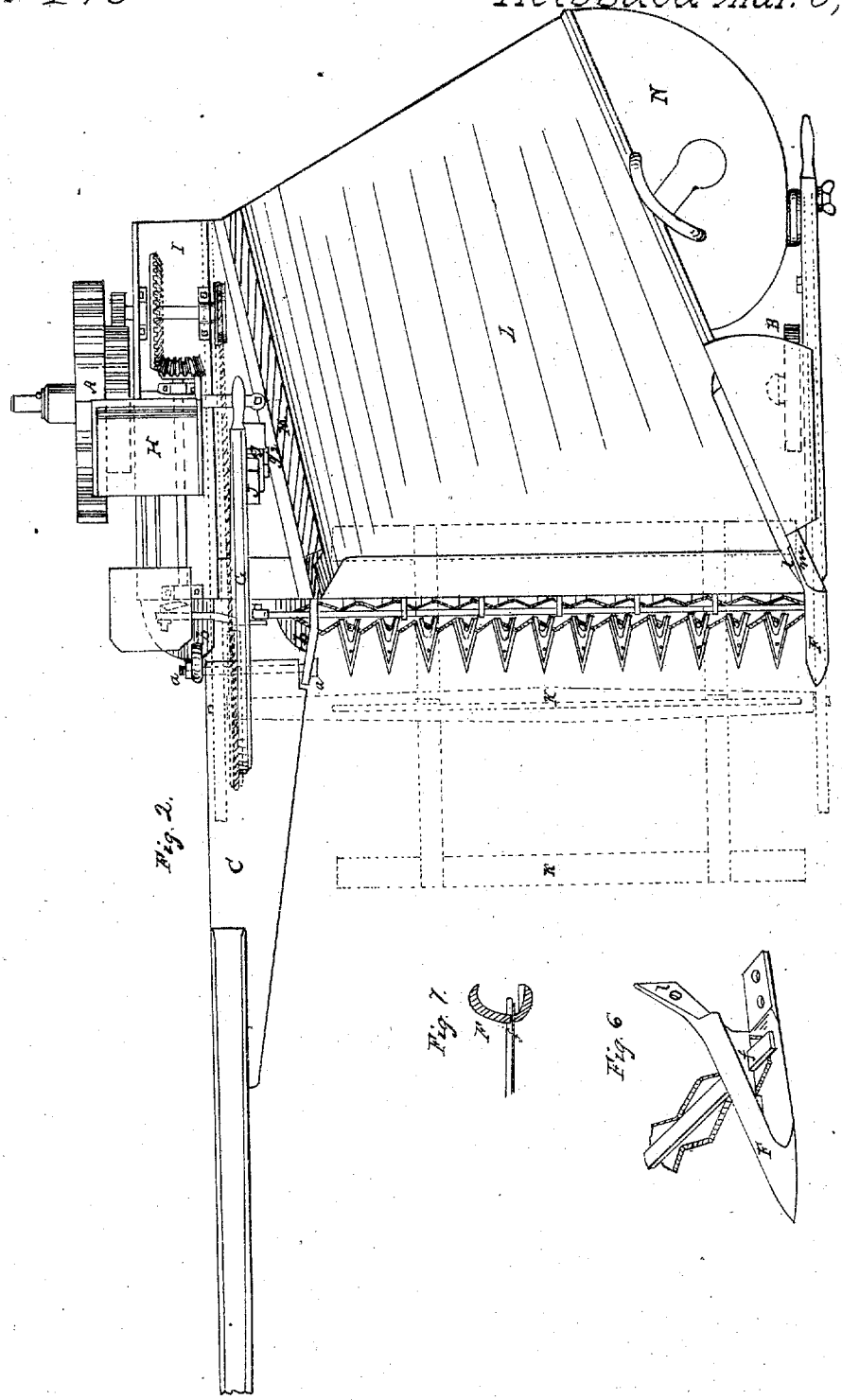
Figure 5:
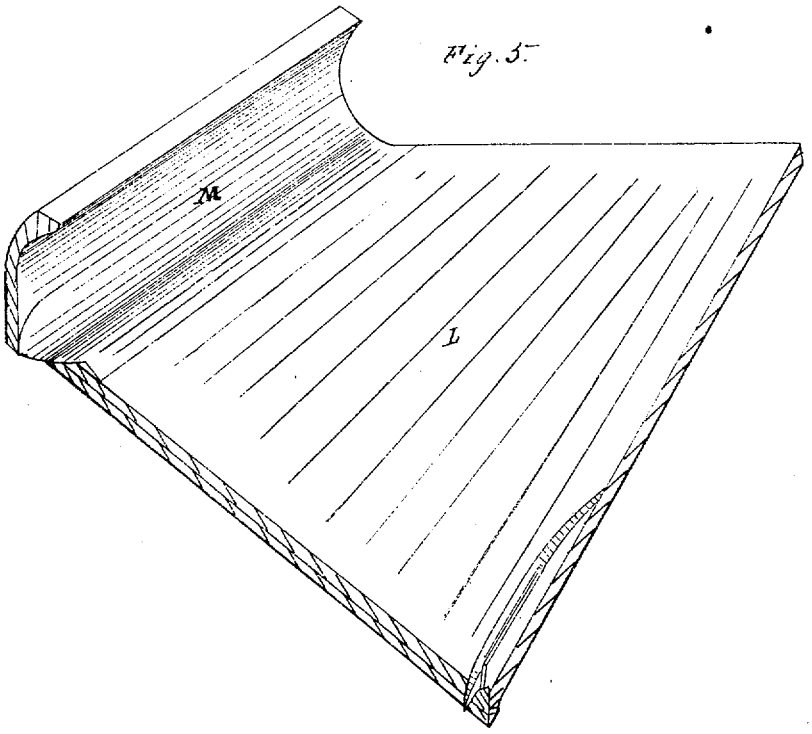
Figure 4:
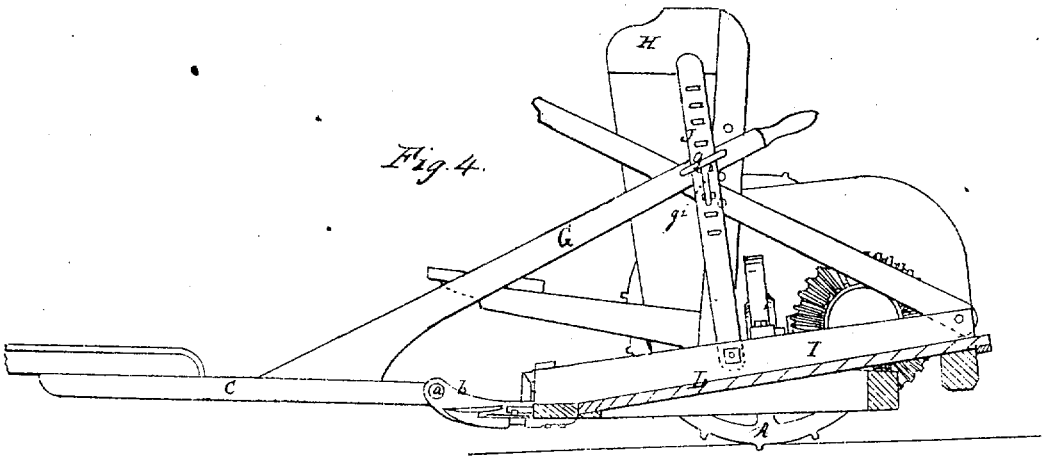

Figure 1 represents a view in perspective of a machine embracing my improvements. Fig. 2 represents a top view of the same. Fig. 3 represents a rear end view of the same. Fig. 4 represents a section at the line *x x* of Fig. 1, with the fence, guard, or wing of the platform removed to exhibit more clearly the arrangement for adjusting the cutters at varying distances from the ground. Fig. 5 represents a view in perspective of the removable platform and the fence or wing detached from the machine. Fig. 6 represents a similar view of the hollow dividing-finger at the inner end of the machine, and that portion of the end of the sickle or cutter which has its bearing therein; and Fig. 7 represents a transverse section of the shell-divider.

My invention consists in making the outside finger or divider (which projects in advance of the cutter to separate the grain to be cut from that which is to be left standing) hollow, so that while it is of sufficient width to effect the proper division of the grain, the bearing for the cutter will not be so broad as to afford such a lodgment for fine grass, grain, &c., that it will accumulate and clog the sickle, which is a difficulty of frequent occurrence when the divider is made solid in the usual manner.

The accompanying drawings represent a harvesting-machine embracing the improvement which is the subject of the present patent. The machine is supported on two wheels, A and B, and provided with driving-gear suitable for giving motion to the cutters and reel; but as the construction and arrangement of the driving-gear and reel are similar to those described in my former patents I deem it unnecessary to describe them particularly here.

The tongue C, by which the horses draw the machine, is attached to the finger-bar, near its outside or right end, by means of a bolt, *a*, passing through ears *b*, and forming a hinge-joint in a line with the front ends of the fingers, which allows the front of the frame to be elevated or depressed in this line.

On the top of the tongue C is an inclined arm, G, which extends upward and backward within reach of the driver, whose seat H is mounted on the frame I. This arm G has a staple, *g*, projecting from its side, through which an upright bar, J, passes, whose lower end is hinged to the frame I. This hinged bar J has a series of holes in it, into any one of which a strong pin, $g^2$, is inserted, to limit the descent of the arm G on the bar J. By this arrangement it is obvious that as the front extremity of the tongue is firmly held by the horses, when the arm G is raised or lowered it will impart a corresponding movement to the front edge of the machine which carries the cutting apparatus, so that the adjustment of the cutters to cut the grain at varying heights is made by raising or lowering the arm G on the bar J and placing the pin $g^2$ beneath it in the proper hole to hold it from falling below the required elevation. The axles of the supporting-wheels constitute the fulcra upon which the frame turns, while the flexure is all at the joint which connects the tongue and finger-bar.

The divider F projects on the left side of the machine in advance of the guard-fingers, and divides the grain to be cut from that which is to be left standing. It has an oblong hole, *f*, made in its inner side, through which the end of the sickle plays. This dividing-bar F is made hollow, as represented, so that, excepting the point, which is solid, it is a mere shell. The stock of the sickle has not sufficient length of bearing in the hole *f* in this divider for grass and grain to affect a lodgment and clog the sickle. At the rear end of the inner side of the divider a lug, *l*, projects with suitable holes through it for bolting onto the diagonal bar *m*, while on its bottom the point projects and is filled with holes to bolt to the end of the finger-bar. In this way the divider forms an angle of iron to bind and support the corner of the frame firmly.

The reel K is represented in Fig. 2 by blue lines. The left side of the platform L extends from the left end of the finger-bar and cutters toward the rear of the machine, and as it extends backward inclines toward the right side of the machine, and therefore diverges from the standing grain. The divergence of this platform from the standing grain is such that when the cut grain is discharged behind it upon the ground the gavel will be far enough removed from the standing grain to leave a clean track between them for the team to travel in on its return while drawing the machine to cut the next swath. In the right side of the oblique platform a wing, M, is placed, whose length is the same as the platform at that side, and whose inner side is made concave. An attendant pushes the cut grain gathered upon the platfarm with a fork against this concave wing into a compact bundle, and then pitches, slides, or delivers it upon the ground in a compact mass by a lateral movement of the fork.

Between the left side of the platform and the left side of the machine a stand or position, N, is arranged for the attendant whose duty it is to fork the grain off the platform. The position of this stand or seat is such that the forker can stand and, if he chooses, push the grain directly back in discharging it in nearly a direct line from the cutters, instead of first pushing it over against the guard to render it more compact. In case the grain is discharged by pushing it directly back. A fork with a large number of tines should be used, and they must spread nearly the full width of the platform, that the forker may push the cut grain from the whole width of the platform directly backward at a single stroke to deliver the gavel evenly upon the ground behind the platform. This I do not deem as good a mode of discharging the grain as when it is first pushed across the platform against the wing, and then slid back, as the gavel is not so compact, so I prefer to discharge the grain with a common three-tined fork, first pushing it from the left side of the platform to the right, then pressing it against the concave guard to form it into a compact bundle, and lastly sliding it off endwise upon the ground behind by a lateral movement of the fork.

What I claim as my invention, and desire to secure by Letters Patent, is—

Making the outside or dividing finger hollow, so that while it affords sufficient room for the play of the end of the sickle the bearing of the latter therein will not be so long as to afford a lodgment of grain, grass, &c., in sufficient quantity to clog it.

In testimony whereof I have hereunto subscribed my name.

JOHN H. MANNY.

Witnesses:
P. H. WATSON,
A. E. H. JOHNSON.